United States Patent Office 3,540,905
Patented Nov. 17, 1970

3,540,905
PROCESS FOR STABLE DISPERSIONS OF DIALDEHYDE POLYSACCHARIDES
Richard Allan Plunkett, Elkhart, Ind., assignor to Miles Laboratories, Inc., Elkhart, Ind., a corporation of Indiana
No Drawing. Filed Jan. 22, 1968, Ser. No. 699,349
Int. Cl. C08b 25/02, 27/42; C08j 1/46
U.S. Cl. 106—213   6 Claims

ABSTRACT OF THE DISCLOSURE

Stable dispersions of dialdehyde polysaccharides, such as dialdehyde starch, can be produced by reacting hydrogen peroxide with an aqueous alcoholic mixture of dialdehyde polysaccharide at a temperature from about 65° C. to about 100° C.

BACKGROUND AND PRIOR ART

Dialdehyde polysaccharides, such as dialdehyde corn starch, are well known in the art and are known to be useful for increasing the wet strength of paper, for example. However, the water solubility and water dispersibility of dialdehyde polysaccharides are quite low and complicated procedures are necessary in order to get sufficient dialdehyde polysaccharide into dispersion so that the paper or paper pulp can be treated with it. This is especially true when the dispersions are to be prepared in high concentrations containing as much as 20-30 weight percent solids. Such concentration levels are desirable for economical handling and shipping of the dispersions. Prior art dispersions of dialdehyde polysaccharides were limited in utility since they became unstable as the polymer chain began to degrade when stored a week or longer at room temperature.

One advance in the prior art of making dialdehyde polysaccharide dispersions involved the use of hydrogen peroxide and is described in U.S. Pat. No. 3,313,641. While this technique produced dispersions having somewhat improved stability, such dispersions were not completely satisfactory from a stability standpoint.

OBJECTS AND SUMMARY OF THE INVENTION

It is an object of the present invention to provide a process for producing stable dispersions of dialdehyde polysaccharides.

It is another object of the present invention to provide a process for producing high solids content dispersions of dialdehyde polysaccharides which have improved resistance to degradation upon standing over a prolonged period of time.

It is a further object of the present invention to provide novel improved stable dispersions of dialdehyde polysaccharides.

According to the present invention, stable dispersions of dialdehyde polysaccharides can be produced by forming a mixture of dialdehyde polysaccharide with an aqueous alcohol mixture, said mixture containing up to about 60 weight percent dialdehyde polysaccharide solids based on total mixture weight, and then contacting said mixture with hydrogen peroxide at a temperature of from about 65° C. to about 100° C.

The alcohol in the aqueous alcohol mixture is selected from the class consisting of methyl alcohol, ethyl alcohol, n-propyl alcohol, isopropyl alcohol, n-butyl alcohol, isobutyl alcohol, sec-butyl alcohol, tert-butyl alcohol and amyl alcohol. Preferably the alcohol is methyl alcohol or ethyl alcohol. These are all monohydroxy aliphatic alcohols.

The dialdehyde polysaccharides useful as starting materials in the present process of preparing stable dispersions are frequently referred to as periodate oxidized polysaccharides. This is due to their preparation by the well-known oxidation of polysaccharides with periodic acid. The preparation of dialdehyde starch is more particularly described in U.S. Pat. Nos. 2,648,629 and 2,713,553.

The dialdehyde polysaccharides useful in the present process may be the dialdehyde derivative of any polysaccharide, such as corn, wheat, rice, tapioca or potato starches, amyloses, amylopectins, gums, dextrans, algins, inulins and the like. Of these polysaccharides, the dialdehyde derivatives known generically as dialdehyde starch are the best known and most widely used. However, where it is desired to have dispersions of dialdehyde derivatives of other polysaccharides, these may be used as well. The dialdehyde polysaccharides useful in the present process can contain from about 50 to about 100 moles percent dialdehyde saccharide units. In general, it is preferred to use dialdehyde polysaccharides which are about 90 to about 100 percent oxidized; i.e., those wherein about 90 to 100 of each 100 of the original anhydroglucose units have been converted to dialdehyde units, such as by periodate oxidation as described above.

While it is not necessary, it is preferable that the water used in the preparation of stable dispersions in this process should be substantially free of metal ions. Such ions can cause hydrolysis and degradation of the dialdehyde polysaccharides. Distilled water or deionized water can be used in the present invention.

The aqueous alcohol mixture to which the dialdehyde polysaccharide is added should contain from about 20 to about 90 weight percent alcohol based on total weight of the aqueous alcohol mixture. Preferably this mixture contains from about 60 to about 90 weight percent alcohol based on total weight of the aqueous alcohol mixture.

The hydrogen peroxide useful in the precent process is employed in the form of commercially available aqueous solutions containing, for example, from about 30 to about 50 weight percent hydrogen peroxide. The hydrogen peroxide is employed in an amount of from about 0.5 to about 10 weight percent based on the dry weight of the dialdehyde polysaccharide. Preferably the hydrogen peroxide is employed in an amount of from about 1 to about 4 weight percent based on the dry weight of the dialdehyde polysaccharide. The hydrogen peroxide oxidizes some of the aldehyde groups of the dialdehyde polysaccharide to carboxy groups. The dispersion thus contains a partially carboxylated dialdehyde polysaccharide.

The overall temperature range useful in the preparation of stable water dispersions of dialdehyde polysaccharides is from about 65° C. to about 100° C. Preferably the reaction temperature is from about 65° C. to about 80° C.

The concentration of dialdehyde polysaccharide in the aqueous alcohol mixture can be any desired amount up to about 60 weight percent based on total mixture weight. Preferably the mixture contains from about 20 to about 25 weight percent dialdehyde polysaccharide.

The cooking time for reaction between the hydrogen peroxide and the aqueous alcohol mixture containing dialdehyde polysaccharide can be as short as 1 hour and as long as 20 hours, for example. The reaction time is dependent upon the concentration of dialdehyde polysaccharide, type and concentration of alcohol, amount of hydrogen peroxide, temperature, and the viscosity desired in the final product. It is preferred that the product dispersion have a viscosity at 27°–28° C. of less than about 300 centipoises to aid in filtration of the dispersion.

In addition to having improved storage stability, the novel aqueous alcoholic dispersions produced by the present invention have the advantages of improved clarity, be-

EXAMPLE 1

A 50-gram portion of dialdehyde potato starch (88 percent oxidized and containing 10 weight percent moisture) was added to an aqueous alcohol mixture consisting of 122.5 ml. ethyl alcohol (containing 94.9 volume percent ethyl alcohol) and 47.5 ml. of deionized water. This aqueous alcohol solution contained 63 weight percent ethyl alcohol based on total weight of the aqueous alcohol mixture. To the resulting mixture containing 23 weight percent dialdehyde starch were added 2.25 ml. of a 50 weight percent aqueous hydrogen peroxide solution (3.0 weight percent hydrogen peroxide based on the dry weight of the dialdehyde starch). The above materials were slurried at 25° C. in a flash equipped with stirrer, thermometer and reflux condenser and immersed in a heating bath. The temperature of the slurry was raised to 78°–80° C. in 15 minutes. At this time some thickening of the slurry was noted. After about 30 minutes a soft gel had formed. After 60 minutes a viscous disperson was formed. A 1.2 gram portion of diatomaceous earth filter aid was then added, and the hot dispersion was easily filtered to remove a relatively small quantity of undispersed starch and insoluble reaction products yielding a viscous, clear, faint yellow dispersion. This dispersion remained unchanged in appearance after three months storage at 25°–30° C.

EXAMPLE 2

A 155 gram portion of dialdehyde corn starch (90–95) percent oxidized and containing 10 weight percent moisture) was added to an aqueous alcohol mixture consisting of 392 ml. ethyl alcohol (containing 94.9 volume percent ethyl alcohol) and 152 ml. of deionized water. This aqueous alcohol solution contained 63 weight percent ethyl alcohol. To the resulting mixture containing 22.6 weight percent dialdehyde starch were added 2.8 grams of a 50 weight percent aqueous hydrogen peroxide solution (1 weight percent hydrogen peroxide based on the dry weight of the dialdehyde starch). The above materials were treated in a manner similar to that described in Example 1. After 6.5 hours at 80° C. a very soft gel was obtained. The temperature was then reduced to 70° C. After an additional 13.5 hours at 70° C. (20 hours total reaction time) 3 grams of filter aid were added and the dispersion was filtered while hot. A clear, yellow-brown viscous solution was obtained which remained stable for at least several months at room temperature.

EXAMPLE 3

A 333-gram portion of dialdehyde corn starch (90–95 percent oxidized and contained 10 weight percent moisture) was added to an aqueous alcohol mixture consisting of 660 grams of isopropyl alcohol and 306 grams of deionized water. This aqueous alcohol solution contained 68 weight percent isopropyl alcohol. To the resulting mixture containing 23 weight percent dialdehyde starch were added 24 grams of a 50 weight percent aqueous hydrogen peroxide solution (4 weight percent hydrogen peroxide based on the dry weight of the dialdehyde starch). The above materials were treated in a manner similar to that described in Example 1. After 5 hours of heating and reaction at 80° C., 6 grams of filter aid were added and the hot dispersion was filtered. A clear light amber solution having a viscosity of 39.5 centipoises at 27°–28° C. was obtained which remained stable for at least several months at room temperature.

EXAMPLE 4

Isopropyl alcohol and deionized water were mixed to form an aqueous alcohol solution containing 21.8 weight percent isopropyl alcohol. Dialdehyde corn starch (90–95 percent oxidized and containing 10 weight percent moisture) was added to the aqueous alcohol solution to form a mixture containing 21 weight percent dialdehyde starch. To this mixture was added sufficient 50 weight percent aqueous hydrogen peroxide solution to provide a hydrogen peroxide content of 3 weight percent based on the dry weight of the dialdehyde starch. The above materials were treated in a manner similar to that described in Example 1. After 1 hour of reaction at 80° C. the resulting dispersion was filtered. A clear light amber solution having a viscosity of 40 centipoises at 27°–28° C. was obtained which remained stable for at least several months at room temperature.

EXAMPLE 5

Methyl alcohol and deionized water were mixed to form an aqueous alcohol solution containing 68 weight percent methyl alcohol. Dialdehyde corn starch (90–95 percent oxidized and containing 10 weight percent moisture) was added to the aqueous alcohol solution to form a mixture containing 23 weight percent dialdehyde starch. To this mixture was added sufficient 50 weight percent aqueous hydrogen peroxide solution to provide a hydrogen peroxide content of 3 weight percent based on the dry weight of the dialdehyde starch. The above materials were treated in a manner similar to that described in Example 1. After 5.5 hours of reaction at 65° C. the resulting dispersion was filtered. A clear amber solution having a viscosity of 29.5 centipoises at 27°–28° C. was obtained which remained stable for at least several months at room temperature.

EXAMPLE 6

A 22.2-gram portion of dialdehyde corn starch (90–95 percent oxidized and containing 10 weight percent moisture) was added to an aqueous ethyl alcohol solution consisting of 55.1 grams of ethyl alcohol and 9.7 grams of deionized water. This aqueous alcohol solution contained 85 weight percent ethyl alcohol. To the resulting mixture containing 23 weight percent dialdehyde starch were added 1.2 grams of a 50 weight percent aqueous hydrogen peroxide solution (3 weight percent hydrogen peroxide based on the dry weight of the dialdehyde starch). The above materials were treated in a manner similar to that described in Example 1. After 2 hours at 78°–80° C. a gel had formed. After an additional 1.5 hours at 80° C. 0.4 gram of filter aid was added, and the thin liquid was filtered. A clear, thin, light yellow dispersion was obtained which was stable on prolonged storage at room temperature.

The improved utility of the present process as compared to the process of U.S. Pat. No. 3,313,641 is shown in the following example.

EXAMPLE 7

An aqueous dispersion of dialdehyde corn starch was prepared by treating an aqueous slurry containing 20 weight percent dialdehyde starch with 2 weight percent hydrogen peroxide based on dry weight of the dialdehyde starch and stirring at 90° C. for 1 hour. The resulting dispersion was cooled to room temperature.

An aqueous alcohol dispersion of dialdehyde corn starch was prepared by adding dialdehyde starch to a mixture of water and isopropyl alcohol containing 70 weight percent isopropyl alcohol to form a mixture containing 23 weight percent dialdehyde starch. The resulting mixture was treated with 2 weight percent hydrogen peroxide based on dry weight of the dialdehyde starch and stirred at 80° C. for 20 hours. The resulting dispersion was cooled to room temperature.

Portions of each of the above two dispersions were stored at 60° C. for 48 hours. This represented accelerated storage conditions. At the end of this time, the prior art non-alcoholic aqueous dispersion had been degraded such that there was an 8.4 percent increase in the amount of molecular fragments that could react further with periodic acid. These fragments resulted from depolymerization of the dialdehyde starch molecules. This is a well-known analytical procedure. In contrast to this the alcoholic aqueous dispersion produced in accordance with the present invention only had a 0.9 percent increase in depolymerization fragments during the same accelerated conditions.

EXAMPLE 8

A 111-gram portion of dialdehyde corn starch (90-95 percent oxidized and containing 10 weight percent moisture) was added to an aqueous n-butyl alcohol solution consisting of 50 grams of deionized water and 200 grams of n-butyl alcohol. This aqueous alcohol solution contained 80 weight percent n-butyl alcohol. To the resulting mixture containing 28 weight percent dialdehyde starch were added 10.5 grams of a 35 weight percent aqueous hydrogen peroxide solution (3.7 weight percent hydrogen peroxide based on the dry weight of the dialdehyde starch). The above materials were treated in a manner similar to that described in Example 1. After 7 hours of heating and reaction at 80° C., the hot dispersion was filtered. A clear dark yellow stable dispersion resulted.

EXAMPLE 9

A 111-gram portion of dialdehyde corn starch (90-95 percent oxidized and containing 10 weight percent moisture) was added to an aqueous ethyl alcohol solution consisting of 11.5 grams of deionized water and 63.5 grams of ethyl alcohol (91.75 weight percent ethyl alcohol). This aqueous alcohol solution contained 78 weight percent ethyl alcohol. To the resulting mixture containing 54 weight percent dialdehyde starch were added 20 grams of a 50 weight percent aqueous hydrogen peroxide solution (10 weight percent hydrogen peroxide based on the dry weight of the dialdehyde starch). The above materials were treated in a manner similar to that described in Example 1. After 1 hour of heating and reaction at 80° C. wherein substantially all the dialdehyde starch was dispersed, the hot dispersion was filtered. The resulting stable dispersion was clear, was only a faint yellow in color and had a viscosity of 292 centipoises.

The novel aqueous alcoholic dialdehyde polysaccharide dispersions produced in accordance with the process of the present invention can be used in a manner well known in the art to improve the wet strength properties of paper, for example, or in the insolubilization of natural and synthetic polymers to form films.

In summary, the present invention relates to treating an aqueous alcohol mixture of dialdehyde polysaccharide with hydrogen peroxide under controlled reaction conditions to produce a dispersion of dialdehyde polysaccharide having improved storage stability.

What is claimed is:

1. A process for producing stable dispersions of dialdehyde starch which comprises forming a mixture of dialdehyde starch containing from about 50 to about 100 mole percent dialdehyde saccharide units with an aqueous alcohol mixture containing from about 20 to about 90 weight percent alcohol based on the total weight of the aqueous alcohol mixture, the alcohol in said mixture being selected from the class consisting of methyl alcohol, ethyl alcohol, n-propyl alcohol, isopropyl alcohol, n-butyl alcohol, sec-butyl alcohol, iso-butyl alcohol, tert-butyl alcohol and amyl alcohol, said mixture containing up to about 60 weight percent dialdehyde starch solids, and then contacting said mixture with from about 0.5 to about 10 weight percent hydrogen peroxide based on the dry weight of the dialdehyde starch at a temperature of from about 65° C. to about 100° C. for from about 1 hour to about 20 hours.

2. A process according to claim 1 wherein the alcohol is methyl alcohol.

3. A process according to claim 1 wherein the alcohol is ethyl alcohol.

4. A process according to claim 1 wherein the hydrogen peroxide is employed in an amount of from about 1 to about 4 weight percent based on the dry weight of the dialdehyde starch.

5. A process according to claim 1 wherein the aqueous alcohol mixture contains from about 60 to about 90 weight percent alcohol based on total weight of the aqueous alcohol mixture.

6. A stable aqueous alcoholic dispersion of dialdehyde starch produced in accordance with claim 1.

References Cited

UNITED STATES PATENTS

| | | | |
|---|---|---|---|
| 3,033,851 | 5/1962 | Schaefer et al. | 260—233.3 |
| 3,313,641 | 4/1967 | Borchert | 106—313 |

ALLAN LIEBERMAN, Primary Examiner

U.S. Cl. X.R.

260—233.3